United States Patent
Asghar et al.

(10) Patent No.: US 6,218,931 B1
(45) Date of Patent: Apr. 17, 2001

(54) HOME-APPLIANCE NETWORK WITH NODES IDENTIFIED BY DIRECT-SEQUENCE SPREADING CODES

(75) Inventors: Saf Asghar, Austin; David Tobias, Pflugerville, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/415,427

(22) Filed: Oct. 8, 1999

(51) Int. Cl.$^7$ .................................................. H04M 11/04
(52) U.S. Cl. ................. 340/310.02; 340/310.03; 340/310.05; 340/310.06
(58) Field of Search .................. 340/310.01, 310.02, 340/310.03, 310.04, 310.05, 310.06, 310.07

(56) References Cited

U.S. PATENT DOCUMENTS 5,400,246 * 3/1995 Wilson et al. ............... 340/825.36 X

* cited by examiner

Primary Examiner—Daryl Pope

(74) Attorney, Agent, or Firm—Conley, Rose & Tayon PC

(57) ABSTRACT

Described herein is a network interface for coupling residential appliances into a code-division multiple access (CDMA) network. The network is used to convey appliance control signals and appliance status signals. The network interface includes a transmitter and/or a receiver, depending on the communications needs of the residential appliance. A spreading-code generator in the network interface generates a spreading code that identifies the residential appliance. A spreading mixer modulates a narrowband transmit signal with the spreading code, thereby generating a spread-spectrum transmit signal. The wideband transmit signal is then coupled into the physical medium of the network. In one embodiment, the physical medium is a residential wiring grid, and a wiring interface in the transmitter unit couples the spreading mixer with the residential wiring. Spread-spectrum signals received from the wiring grid are despread with an appropriate spreading code to extract the desired signal. Also described herein is a network interface for a wired network. The network interface includes a modulator configured to receive a stream of transmit data and to generate a modulated carrier signal from the data. The modulated carrier is spread by a direct-sequence spreading circuit, using a node-specific spreading code, into a wideband signal. The wideband signal is then coupled onto the wired network.

6 Claims, 3 Drawing Sheets

| 0 | 1 1 1 1 1 1 1 1 |
|---|---|
| 1 | 1 0 1 0 1 0 1 0 |
| 2 | 1 1 0 0 1 1 0 0 |
| 3 | 1 0 0 1 1 0 0 1 |
| 4 | 1 1 0 0 0 0 1 1 |
| 5 | 1 0 0 1 0 1 1 0 |
| 6 | 1 1 1 1 0 0 0 0 |
| 7 | 1 0 1 0 0 1 0 1 |

HOME-APPLIANCE NETWORK WITH NODES IDENTIFIED BY DIRECT-SEQUENCE SPREADING CODES

BACKGROUND OF THE INVENTION

1. Field of the Invention

The invention relates generally to electronic communication and home automation, and more particularly, to devices for communicating on home-appliance networks.

2. Description of the Related Art

Home automation systems have gained increasing popularity due to advances in digital signal processing and reductions in the cost of home computer equipment. These systems allow centralized and remote control over electric and electronic appliances and devices in the home, such as interior lights, exterior lights, fans, and other devices. One system, by X10 Ltd., uses electrical sockets and electrical switches with transceivers that communicate over a house's electrical wiring system. The sockets and switches can receive commands from and/or provide status information to one or more control stations plugged into the house's wiring. The control system may be a specialized unit or a home computer configured to interface with the house wiring. With the appliances connected through this system, a user can readily execute simple controls over the appliances from a central location. These controls include turning on and off lights, dimming lights, setting lights and stereo equipment to turn on or off at predetermined or random times, and other similar functions.

The appliances in these systems communicate through high-frequency pulses (typically 120 kHz) transmitted on the home wiring grid during the zero-crossings of the 120 VAC/60 Hz voltage cycles. The presence or absence of a high-frequency pulse indicates a binary 1 or 0. The information is communicated with some redundancy: the two zero-crossings in each 60 Hz cycle are used to transmit one bit. If the high-frequency pulse is present during the first zero-crossing, it will be absent during the second, and vice-versa. In this version of the signaling system, the appliances can thus communicate at a rate of up to 60 bits per second.

With increasing complexity of appliances in the home, it is expected that more sophisticated signaling techniques will be necessary for transmitting information among the connected appliances. It may be useful, for example, to have increased data rates, enhanced noise immunity, simultaneous communication with more than one device, or the ability to communicate on a network other than the home wiring grid. Similarly, the prior art might require each device to have a complex input stack for monitoring all of the commands over the network instead of just the commands relevant to that particular device. Since implementing this stack would increase the software complexity, more hardware and computing power would also be required to support it. As a result, it might also be desirable to simplify these software and hardware requirements.

SUMMARY OF THE INVENTION

Described herein is a network interface for coupling residential appliance into a code-division multiple access (CDMA) network. The network is used to convey appliance control signals and an appliance status signals. The network interface includes a transmitter and/or a receiver, depending on the communications needs of the residential appliance.

The transmitter includes a digital-to-analog converter (DAC) that receives a stream of data and generates a baseband signal from the data stream. Also in the transmitter is a high-frequency oscillator that generates a carrier wave, and a high-frequency mixer that modulates the carrier with the baseband signal to generate a narrowband transmit signal. A spreading-code generator in the transmitter unit generates a spreading code that identifies the residential appliance. A spreading mixer modulates the narrowband transmit signal with the spreading code, thereby generating a wideband transmit signal. The wideband transmit signal is then coupled into the physical medium of the network. In one embodiment, the physical medium is a residential wiring grid, and a wiring interface in the transmitter unit couples the spreading mixer with the residential wiring.

A receiver in the network interface receives a wideband communications signal from the network. In one embodiment, the network medium is a residential wiring grid, and the receiver unit includes a wiring interface. The receiver wiring interface provides the wideband signal to a despreading mixer that recovers a narrowband signal using a locally-generated spreading code. A detector unit demodulates the narrowband signal to recover the received data.

The network interface may be incorporated in a wall socket or in a light switch. Alternatively, the network interface may be included in the residential appliance or inserted between the residential appliance and the residential electrical wiring.

Also decried herein is a transmitting network interface for a wired network. The network interface includes a modulator configured to receive a stream of transmit data and to generate a modulated carrier signal from the data. The modulated carrier is spread by a direct-sequence spreading circuit, using a node-specific spreading code, into a wideband signal. The wideband signal is then coupled onto the wired network.

Further, this disclosure describes a receiving network interface for a wired network. A receiver in the network interface receives a wideband signal from a network of residential appliances, and a direct-sequence despreading circuit uses a node-specific spreading code to recover a modulated carrier signal from the wideband signal. A detector then recovers a stream of received data from the modulated carrier signal.

BRIEF DESCRIPTION OF THE DRAWINGS

Other objects and advantages of the invention will become apparent upon reading the following detailed description and upon reference to the accompanying drawings in which.

Figures 1, 2:
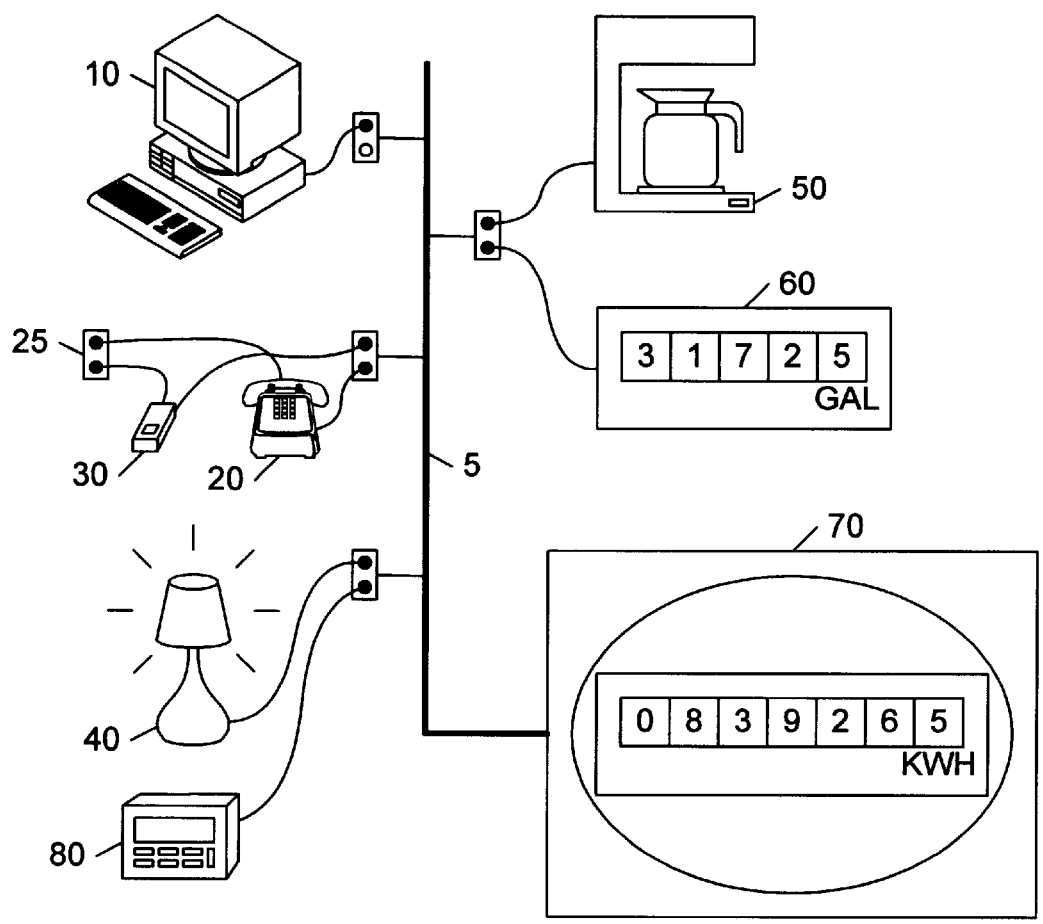
FIG. 1 shows a network of home appliances with each element connected through direct-sequence spread-spectrum communications links on residential electrical wiring.
FIG. 2 shows a sample set of spreading codes for identifying each of the network elements in FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1: Home Appliance Network with Direct-Sequence Spread-Spectrum Links through Home Wiring FIG. 1 shows a network of home appliances linked into a network over the electrical wiring 5 of a home. The network may include, for example, one or more data-processing systems such as a home computer 10, telephone equipment such as a telephone 20 and an answering machine 30, lighting units such as a lamp 40, power tools, cleaning appliances, cooking appliances such as a coffee maker 50, and metering devices such as a water meter 60 and an electrical meter 70. The home devices are thus network elements that each communicate with a central control device. In addition (or instead), the network elements may communicate directly among themselves. The central control device, if present, may be a general computing device such as home computer 10, or a specialized home-control unit 80 configured to communicate with the appliances.

Control unit 80 is preferably configured to control the power supplied to some of the networked appliances. Thus, the unit 80 may be used to switch or dim lamp 40, for example. Control unit 80 is preferably also configured to receive status information from the appliances, such as the current power status of lamp 40. The network may also be used to gather information. For example, computer 10 is preferably configured to gather water and electrical power usage data from water and electrical meters 60 and 70. Computer 10 or control unit 80 may also be used to turn on or off coffee maker 50 at a pre-set time.

The network of appliances is preferably configured with carrier frequencies and appropriate hardware so that the data transmission rates are between 10 bits/sec and 100 Mbits/sec.

In one embodiment, the central control device is additionally configured to receive and/or transmit information over a telephone line. The central control device may be directly connected to a telephone port or it may relay data through another device, such as telephone 20, connected to a telephone port 25.

FIG. 2: Spreading Codes

FIG. 2 shows an exemplary set of eight spreading codes, numbered 0 through 7 that can be used as identifiers or "keys" for each of the networked appliances in FIG. 1. The appliances communicate on a common medium: their transmission signals are superposed upon each other in the house wiring 5. To allow a receiving unit to extract a particular signal from the superposition of received signals, the appliances each modulate their transmission signals with their corresponding spreading codes. The spreading codes are orthogonal sequences of repeated "chips" (represented by the zeros and ones in FIG. 2). The orthogonality of the spreading codes allows the network to divide the channel into a number of different sub-channels for access by the multiple appliances. Each of the sub-channels is identified by one of the spreading codes. Thus, this network is an example of a code-division multiple access (CDMA) system.

Figure 3:
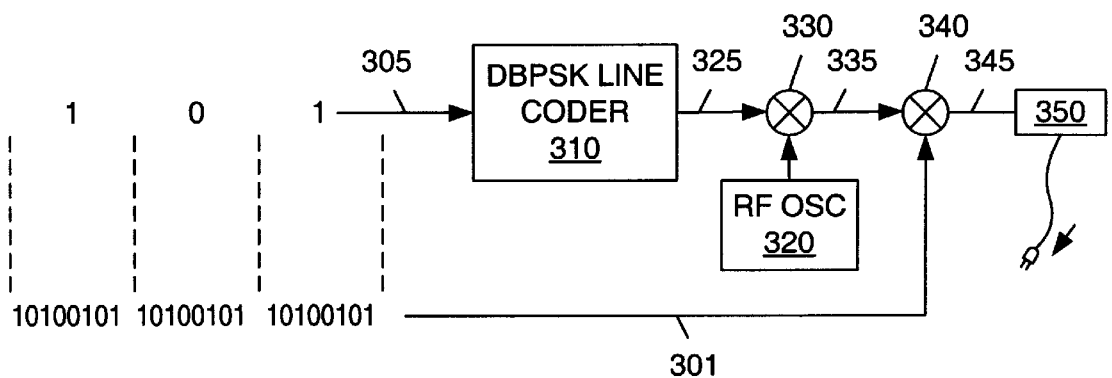
FIG. 3 is a block diagram of a direct-sequence spread-spectrum transmitter used in the network elements.

FIG. 3: Transmitter Unit

Each of the networked appliances in FIG. 1 is coupled to the house wiring through a direct-sequence spread-spectrum (DSSS) transmitter and/or a DSSS receiver. If an appliance is configured only to transmit information without receiving (as may be the case in one embodiment of electrical meter 70, for example), the device includes a DSSS transmitter and no receiver. Similarly, a receive-only device (such as one embodiment of coffee-maker 50, for example) includes a receiver but no transmitter. In preferred embodiments, all the networked appliances include both DSSS transmitters and receivers, so that received information can be confirmed and so that transmissions may be made only when requested by other devices.

FIG. 3 is a block diagram of one embodiment of a transmitter used in the appliances. The transmitter includes a differential binary-phase shift-keying (DBPSK) line coder 310, an RF oscillator 320, an RF mixer 330, a spreading mixer 340, and a wiring interface 350. Line coder 310 receives a stream of digital transmit data 305 and encodes it into a baseband transmit signal 325 that comprises a series of information symbols, each with a duration of a symbol period. The baseband transmit signal 325 is mixed in RF mixer 330 with an RF carrier wave to generate an RF transmit signal 335. The RF carrier is a high-frequency carrier with a frequency preferably in the range of 500 Hz to 5 GHz. Spreading mixer 340 receives the transmit signal 335 and multiplies it by the spreading sequence from FIG. 2 that identifies the transmitting device (or alternatively, the receiving device). The timing of this spreading sequence is controlled by a transmission spreading clock (not shown) that is preferably synchronized with the transmit data stream. In the embodiment shown in FIG. 3, the spreading code is timed so that each repetition of the spreading code coincides with one transmit symbol. In other embodiments, the repetition rate of the spreading codes may be greater than or less than the symbol rate.

The multiplication in spreading mixer 340 results in a version of the transmit signal with a wider spectrum: the rapid chip rate of the spreading sequence "spreads" the transmit signal 335 into a wideband transmit signal 345. The orthogonality of the different wideband signals transmitted by the several appliances on the network allows for a receiver to distinguish among the signals. In one embodiment of the system, the spreading is also used to provide increased noise immunity for the signals conveyed on the network 5.

Spreading mixer 340 provides wideband transmit signal 345 to a wiring interface 350. Wiring interface 350 is configured to couple the wideband transmit signal 345 onto home wiring 5. In one embodiment, wiring interface 350 is a standard 120 VAC plug coupled to spreading mixer 340 through a high-pass filter, so that the relatively low-frequency (60 Hz) electrical power is blocked while the transmission signal 345 is injected onto the home wiring 5.

The spreading code used by way of example in FIG. 3 is code No. 7 from FIG. 2. The set of orthogonal codes shown in FIG. 2 are an example of Walsh codes. In other embodiments of the network, other types of spreading codes can be used.

As indicated above, in embodiment of the transmitter units, line coder 310 is DBPSK encoder. In other embodiments, line coder is a differential quadriphase-shift keying device that encodes two bits into each transmit symbol. Line coder 310 may also be a coherent encoder, such as a BPSK or QPSK encoder, for example. With such coherent signaling schemes, the network uses auxiliary symbol-synchronization systems to identify the timing of the transmitted symbols. In general, line coder 310 may use any of several signaling techniques, including amplitude-shift keying (ASK), phase-shift keying (PSK), and frequency-shift keying (FSK), or combinations thereof, with or without differential encoding.

Figure 4:
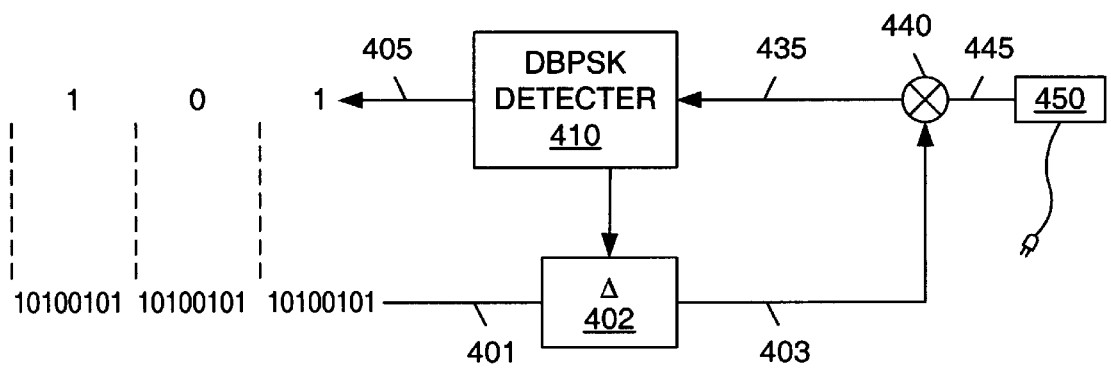
FIG. 4 is a block diagram of a direct-sequence spread-spectrum receiver used in the network elements.

FIG. 4: Receiver Unit

The operations of the transmitter unit from FIG. 3 are substantially reversed in the receiver unit. FIG. 4 is a block diagram of one embodiment of a receiver used in the appliances. The receiver includes a DBPSK detector 410, a despreading mixer 440, and a wiring interface 450. Wiring interface 450 receives a wideband received signal from home wiring 5 and provides the wideband signal to despreading mixer 440. Despreading mixer 440 mixes the wideband signal with the appropriate spreading signal and filters the product so that all the transmission signals except the desired transmission signal are substantially rejected.

The resulting single narrowband received signal 435 is provided to detector 410, which decodes the modulated symbols into a received data stream 405.

In a preferred embodiment, detector 410 includes a matched filter for receiving the narrowband signal 435, a carrier-recovery circuit for synchronizing a local oscillator used in demodulation, a slicer for identifying the received DBPSK symbol, and a differential decoder for identifying the received bit.

A delay unit 402 introduces a variable delay between the locally generated spreading code 401 and the spreading code 403 used for despreading. This delay is adjusted, preferably with feedback from detector 401, so that spreading code 403 is substantially synchronized with the spreading code in the desired component of wideband received signal 445. The detector 410 preferably includes a timing-recovery circuit that measures the timing shift (and preferably also any frequency shift) between the receiver's spreading code 403 and the spreading code in wideband received signal 445. The measured shift is used to adjust delay unit 402 to maintain a synchronization with the received spreading code.

In one embodiment of a network interface for an appliance, the two wiring interfaces 350 and 450 (for transmission and for reception) are combined into a single unit.

Figure 5:
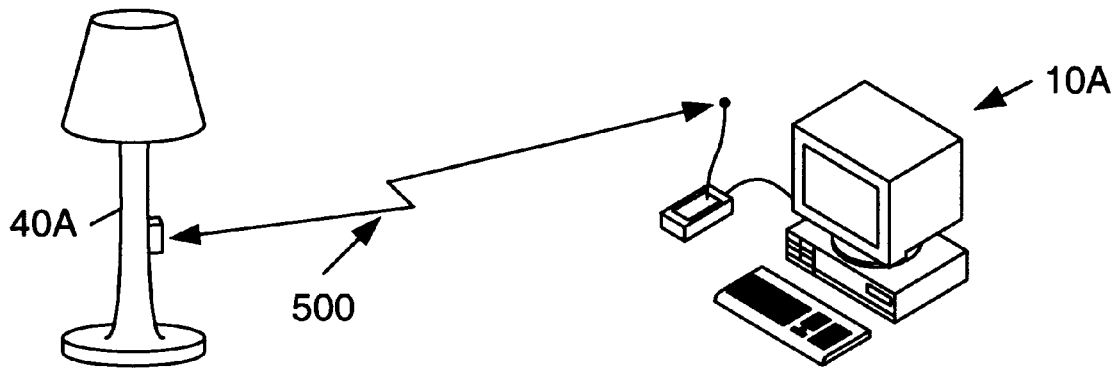
FIG. 5 is representative view of a spread-spectrum network using wireless links.

FIG. 5: Wireless Network

Another embodiment of the network links is shown in FIG. 5. Instead of using the home wiring, this embodiment uses a wireless spread-spectrum link 500 to connect two or more household appliances, such as lamp 40A and computer 10A. Spread-spectrum link 500 is preferably a radio link that propagates through free space. In other embodiments, the radio signal is transmitted on a coaxial cable, a twisted-pair line or other wired line, or a waveguide. In other embodiments, spread-spectrum link 500 can be an IR, visible, or other optical link, conveyed either in free space or through an optical fiber.

Spread-spectrum communications have traditionally been used in wireless links. It is noted that in addition to using DSSS techniques to achieve multiple access over a wireless link, DSSS/CDMA techniques can be used to provide multiple access over a wired network. In one embodiment of the spread-spectrum network, the network elements are computing devices that communicate over a shared channel with carrier signals in the frequency range of several kHz to tens of GHz and with bit rates between 10 kbps and 500 Mbps. The channel is shared by assigning unique spreading codes to each of the computing devices. A device then encodes its transmissions on the wired network by modulating them onto a carrier signal and then spreading the modulated carrier with the appropriate spreading code. The appropriate spreading code may be that of the sender or receiver, as determined by a CDMA communications protocol.

It is to be understood that multiple variations, changes and modifications are possible in the aforementioned embodiments of the invention described herein. Although certain illustrative embodiments of the invention have been shown and described here, a wide range of modification, change, and substitution is contemplated in the foregoing disclosure and, in some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A network interface for a residential appliance, the network interface comprising:

a digital-to-analog converter (DAC) configured to receive a stream of transmit data and to generate a baseband signal therefrom;

wherein the transmit data include one or more of: an appliance control signal and an appliance status signal;

a high-frequency oscillator configured to generate a carrier wave;

a high-frequency mixer coupled to said high-frequency oscillator and to said DAC, wherein said high-frequency mixer is configured to receive the carrier wave from said high-frequency oscillator and to modulate the baseband signal onto the carrier wave, thereby generating a narrowband transmit signal;

a spreading-code generator configured to generate a spreading code, wherein the spreading code identifies the residential appliance;

a spreading mixer coupled to said high-frequency mixer and to said spreading-code generator, wherein said spreading mixer is configured to receive the narrowband transmit signal from said high-frequency mixer, and to receive the spreading code from said spreading-code generator, wherein said spreading mixer is configured to modulate the narrowband transmit signal with the spreading code, thereby generating a wideband transmit signal;

a wiring interface coupled to said spreading mixer and configured to receive the wideband transmit signal therefrom;

wherein the wiring interface is adapted to transmit the wideband transmit signal onto a household power grid;

wherein the wiring interface is further adapted to receive a wideband received signal from the household power grid;

a despreading mixer coupled to said wiring interface and to said spreading-code generator, wherein said despreading mixer is configured to receive the wideband received signal from the wiring interface and to receive the spreading code from said spreading-code generator, wherein said despreading mixer is configured to demodulate the wideband received signal with the spreading code, thereby recovering a narrowband received signal;

a detector circuit coupled to said despreading mixer and configured to generate a digital signal in response to the narrowband received signal.

2. The network interface of claim 1, wherein the network interface is adapted for mounting in an electrical receptacle or in an electrical switch.

3. The network interface of claim 1, wherein the network interface is adapted for mounting in the residential appliance.

4. The network interface of claim 1, wherein the spreading code is a Walsh code or a maximal-length spreading sequence.

5. The network interface of claim 1, wherein the residential appliance is a data-processing system, a telephone device or a lighting unit, a cleaning appliance, a cooking appliance or a metering device.

6. The network interface of claim 1, wherein said DAC is a PSK modulator, an ASK modulator, or an FSK modulator.

* * * * *